United States Patent
Cortinovis (10) Patent No.: US 7,905,336 B2
(45) Date of Patent: Mar. 15, 2011

(54) PROTECTIVE BOOT FOR A PISTON-CYLINDER UNIT OF A DISK BRAKE

(75) Inventor: Gianpaolo Cortinovis, Dalmine (IT)

(73) Assignee: Freni Brembo S.p.A., Curno (IT)

( * ) Notice: Subject to any disclaimer, the term of this patent is extended or adjusted under 35 U.S.C. 154(b) by 0 days.

(21) Appl. No.: 10/432,954

(22) PCT Filed: Nov. 30, 2000

(86) PCT No.: PCT/IT00/00493
§ 371 (c)(1),
(2), (4) Date: Sep. 9, 2003

(87) PCT Pub. No.: WO02/44580
PCT Pub. Date: Jun. 6, 2002

(65) Prior Publication Data
US 2004/0026194 A1   Feb. 12, 2004

(51) Int. Cl.
*F16D 65/20* (2006.01)
(52) U.S. Cl. .................... 188/370; 188/73.1
(58) Field of Classification Search .......... 188/218 A, 188/218 XL, 250 F, 250 G, 73.1, 370, 322.18, 188/72.4, 72.5, 264 G; 277/345, 353, 399, 277/404, 407, 409, 411, 944, 573, 575, 634, 277/637, 641, 500, 636; 74/18.2; 92/168; 403/50, 51
See application file for complete search history.

(56) References Cited

U.S. PATENT DOCUMENTS

| 3,528,301 | A | * | 9/1970 | Wasmer | 74/18.2 |
|---|---|---|---|---|---|
| 4,121,845 | A | * | 10/1978 | Reynolds et al. | 277/634 |
| 4,431,090 | A | | 2/1984 | Kinoshita | 188/264 G |
| 4,524,677 | A | | 6/1985 | Ashman et al. | 92/168 |
| 4,537,289 | A | | 8/1985 | VonGrunberg et al. | 188/72.4 |
| 4,809,821 | A | | 3/1989 | Fulmer | 188/72.4 |
| 5,048,648 | A | * | 9/1991 | Le Deit | 188/370 |
| 5,090,520 | A | * | 2/1992 | Gockel et al. | 188/73.45 |
| 5,219,052 | A | * | 6/1993 | Fanelli et al. | 188/364 |

FOREIGN PATENT DOCUMENTS

| EP | 211452 A1 | * | 2/1987 |
|---|---|---|---|
| EP | 411814 A2 | * | 2/1991 |
| FR | 2 685 749 | | 7/1993 |
| JP | 7-180734 | * | 7/1995 |

OTHER PUBLICATIONS

STIC translation of FR 2685749.*

* cited by examiner

*Primary Examiner* — Bradley T King
(74) *Attorney, Agent, or Firm* — Hogan Lovells US LLP (57) ABSTRACT

A flexible boot for protecting a cylinder-piston unit of a disk brake of the type that includes a piston slidable in a cylinder in order to act on a brake pad. The flexible boot has a surface with a portion that can face a wall of the pad when in a rolled-up position. The flexible boot is characterized in that it comprises at least one spacer element that is associated with the surface and is intended to come into contact with the wall of the pad in order to keep the portion of the surface spaced from the wall of the pad.

28 Claims, 6 Drawing Sheets

PROTECTIVE BOOT FOR A PISTON-CYLINDER UNIT OF A DISK BRAKE

SCOPE OF THE INVENTION

The present invention relates to flexible boots, also known as dust guards for protecting piston-cylinder units usable in disk brakes.

BACKGROUND OF THE INVENTION

In general, in a disk brake, the braking force is produced by piston-cylinder units formed in a suitable caliper and each comprising a cylinder in which a piston can slide so as to be able to act, by means of pads, on opposed surfaces of a rotating disk.

The piston-cylinder unit typically has a flexible boot for protecting the cylinder and the piston (particularly their sliding surfaces) against the entry of foreign material and/or corrosive agents such as, for example, dust, dirt, or moisture, which may prevent the piston sliding correctly inside the cylinder during a braking operation and/or may give rise to corrosion of the sliding surfaces of the piston and of the cylinder.

The flexible boots normally in use are bellows-shaped and such a boot is fitted on the piston-cylinder unit by fixing one of its ends around the piston and an opposite end around the cylinder so as to form a protective barrier which extends around the piston-cylinder unit in the region of the opening of the cylinder.

When the flexible protective boot is in the rest condition or when it is fitted in a disk brake in which the piston is disposed entirely inside the cylinder, as occurs with pads which are not worn, the boot adopts a configuration in which some of its portions are rolled up around one another so as to form one or more bends or pleats. It should be noted that, when the flexible boot is fitted on a disk brake, these pleats have convex portions facing towards the pad and, in particular, towards a support plate of a friction lining of the pad. As a result of wear of the friction linings of the pads, the piston extends towards the disk and the flexible boot stretches out to adapt to the new position adopted by the piston.

It is known that, during the assembly of the disk brake and, in particular, during the installation of the piston-cylinder unit and its flexible protective boot, a certain amount of air may remain trapped in the space between the boot and the piston-cylinder unit.

During a braking operation, because of the overheating of the disk on which the pad acts, heat is emitted and is transmitted to the trapped air by the piston, increasing the pressure which the air exerts on the flexible boot. This pressure may cause expansion of the flexible boot such as to bring its pleats or other portions of the boot into direct contact with the pad and, in particular, with the support plate. This contact is particularly likely in disk brakes having new, that is, unworn friction linings, in which the piston is substantially entirely retracted into the cylinder and the convex portions of the pleats of the flexible boot are close to the support plate.

It is pointed out that, as a result of the braking operation and, in particular, if this operation is prolonged, the pad is at a high temperature and may therefore burn or in any case damage the flexible boot with which it is in contact, necessitating its replacement if the problem is noticed.

Moreover, the problem of the contact between the flexible boot and the pad is particularly marked in disk brakes using floating calipers which require flexible boots of considerable extent so that the boots have several pleats that come close to the pad.

A method proposed by the prior art for preventing this damage provides for the use of a flexible boot having a suitable hole for the outlet of trapped air. According to this technique, the discharge of the air prevents bulging of the boot and hence contact with the pad.

As is known from U.S. Pat. No. 4,809,821, a further method provides for the formation, in the vicinity of the cylinder, of a suitable annular channel in which the pleats forming the flexible boot can be housed completely so that they remain a suitable distance from the pad.

However, it has been found that the methods proposed up to now do not prevent contact between the flexible protective boot and the pad or the consequent burning which damages the boot.

In fact, because of the high temperatures which may be reached during braking, the use of air-outlet holes does not suffice entirely to prevent the expansion of the air and of the boot trapping it.

It has also been noted that contact between the boot and the pad is not only brought about by the above-mentioned expansion of the air but may be due to incorrect positioning of the pleats which form the boot. For example, an incorrect arrangement of the pleats of the boot may occur during assembly by the manufacturer or, more probably, as a result of the refolding of the flexible boot following the replacement of the pads by a maintenance person. In fact, the replacement of the pads, which requires the piston to be returned into the cylinder, is an operation which may be performed in conditions such as not always to ensure correct refolding of the boot because of the limited space which is left free by the pads that have been removed.

It should also be borne in mind that, as well as complicating and weakening the structure of the caliper in which the cylinder is formed, the presence of a suitable channel for completely housing the flexible boot does not solve the problem created by incorrect mounting of the boot or by the bulging brought about by the heating of trapped air.

OBJECTS OF THE INVENTION

The problem upon which the present invention is based is that of proposing a flexible boot for protecting a piston-cylinder unit usable in a disk brake which does not have the disadvantages indicated above with reference to the prior art.

SUMMARY OF THE INVENTION

This problem is solved by means of a flexible boot for protecting a piston-cylinder unit of a disk brake including a piston slidable in a cylinder in order to act on a brake pad, the flexible boot having a surface comprising a portion which can face a wall of the pad, characterized in that it comprises at least one spacer element which is associated with the surface and is intended to come into contact with the wall of the pad in order to keep the said portion of the surface spaced from the wall of the pad.

BRIEF DESCRIPTION OF THE DRAWINGS

Further characteristics and the advantages of the invention will become clear from the following description of preferred embodiments thereof, given by way of non-limiting example with reference to the appended drawings, in which.

DETAILED DESCRIPTION OF THE INVENTION

Figure 1:
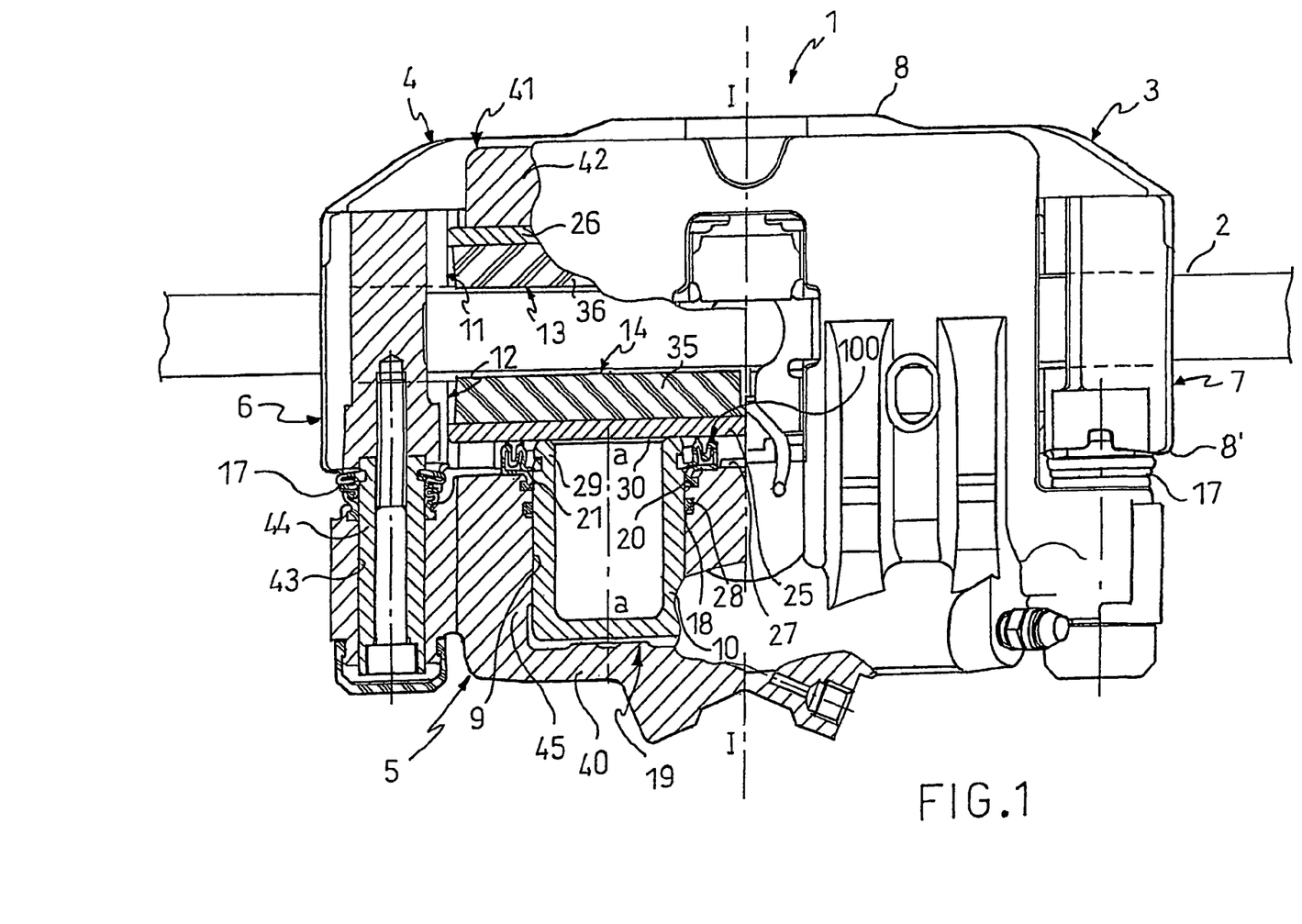
FIG. 1 is partially-sectioned plan view of a disk brake according to the invention.
Figure 2:
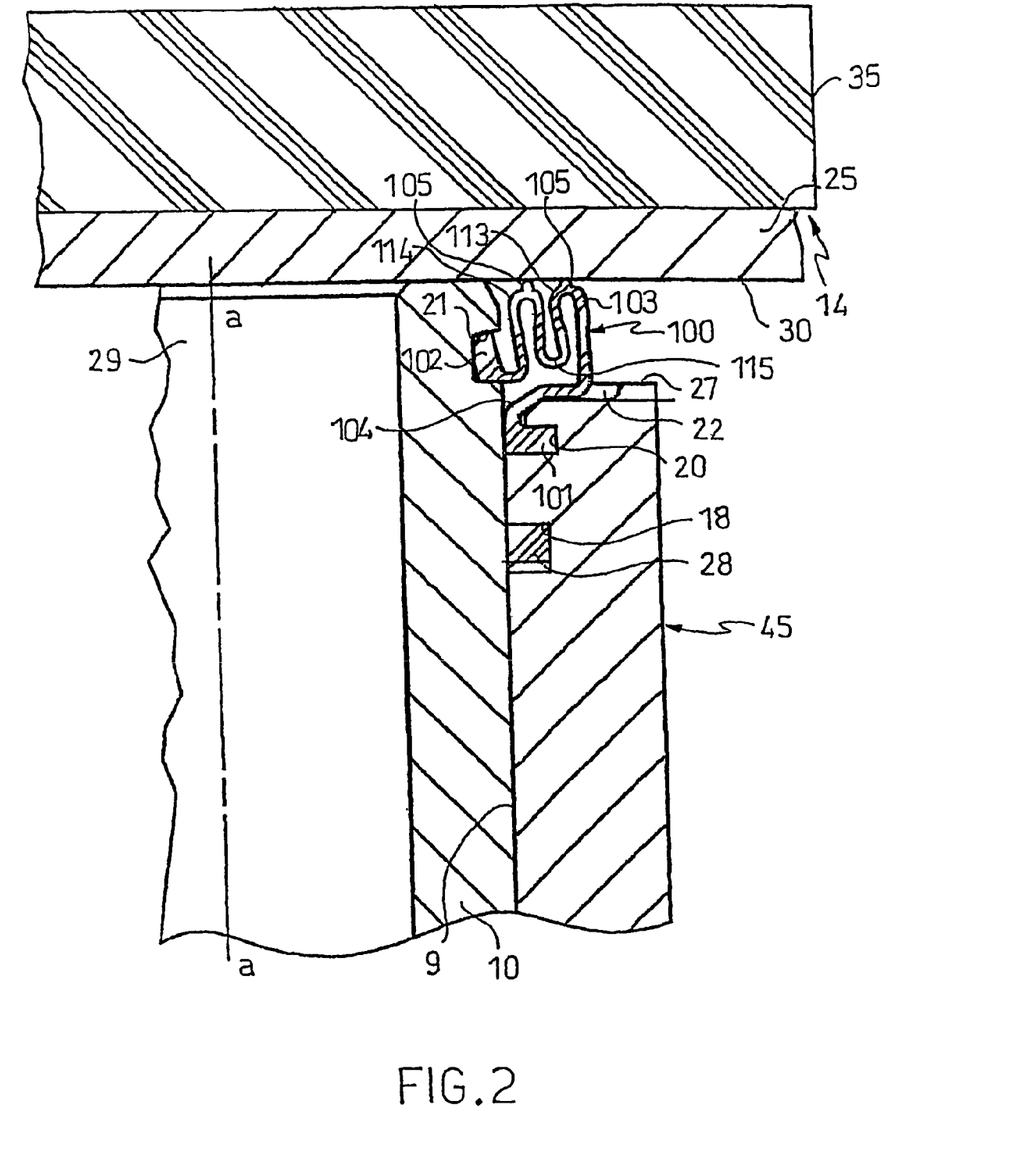
FIG. 2 is shows a portion of the disk brake of FIG. 1, on an enlarged scale.

FIGS. 1 and 2 show, in general, a disk brake 1 for acting on a braking band of a disk 2, particularly for a motor vehicle, not shown.

In the particular embodiment shown in FIG. 1, the disk brake 1 is of the floating-caliper type, but the present invention may be applied to disk brakes of different types such as, for example, fixed-caliper disk brakes.

The disk brake 1 comprises a disk 2 for association with a wheel of the motor vehicle, and a caliper 3 including a bracket 4 and a floating body 5 mechanically coupled to the bracket 4.

The bracket 4, which can be fixed to a stub axle of the motor-vehicle suspension, has a first bridge element 6 and a second bridge element 7 which are substantially U-shaped and are arranged astride the disk 2 on the left-hand side and on the right-hand side of an axis I-I of the disk brake 1, respectively. The first and second bridge elements 6 and 7 are connected to one another rigidly by means of a first cross-member 8 and a second cross-member 8' which extend substantially perpendicular to the axis I-I, on opposite sides of the disk 2.

Moreover, two seats 11 and 12 are formed in the bracket 4 for housing respective pads 13 and 14. The pads 13 and 14 comprise respective plates 25 and 26 for supporting corresponding friction linings 35 and 36.

The floating body 5 is arranged astride the disk 2 and the pads 13 and 14 and comprises a side 40 which extends beside the plate 25 and a side 41 which extends beside the plate 26 and has a projection 42 having a flat surface which can act on the plate 26.

The side 40 of the floating body 5 has, in the region of opposite ends of the axis I-I, respective cylindrical seats 43, each engaged for sliding in a guided manner on a cylindrical guide 44 fixed to the bracket 4. Only the cylindrical seat 43 and the corresponding guide 44 disposed on the left-hand side of the axis I-I are visible in FIG. 1. Moreover, a conventional protective boot 17 is fitted between each cylindrical seat 43 and the corresponding cylindrical guide 44.

In the embodiment described, the side 40 of the floating body 5 includes two piston-cylinder units 19 of which only one is visible in FIG. 1. Each piston-cylinder unit 19 comprises a portion 45 of the side 40 which defines internally a hydraulic cylinder 9 of axis a-a, having an opening 27 facing towards the seat 12, and a piston 10 which has a head 29 and can slide axially in the cylinder 9 so as to act on the pad 14.

Ducts are present in the floating body 5, in conventional manner, for the supply of brake fluid to the cylinder 9. The cylinder 9 has an annular groove 18 for a conventional seal 28.

The piston-cylinder unit 19 also has a flexible boot 100 for protecting the cylinder 9 and the piston 10 (particularly their sliding surfaces) from the entry of foreign material and/or corrosive agents.

The flexible boot 100 is bellows-shaped and is such as to have a rolled-up configuration comprising one or more pleats or bends when it is at rest or when the piston 10 to which it is connected is inside the cylinder 9. Moreover, the flexible boot 100 can extend to adopt a substantially cylindrical or frusto-conical shape when the piston 10 extends from the cylinder 9 towards the disk 2.

Figure 3:
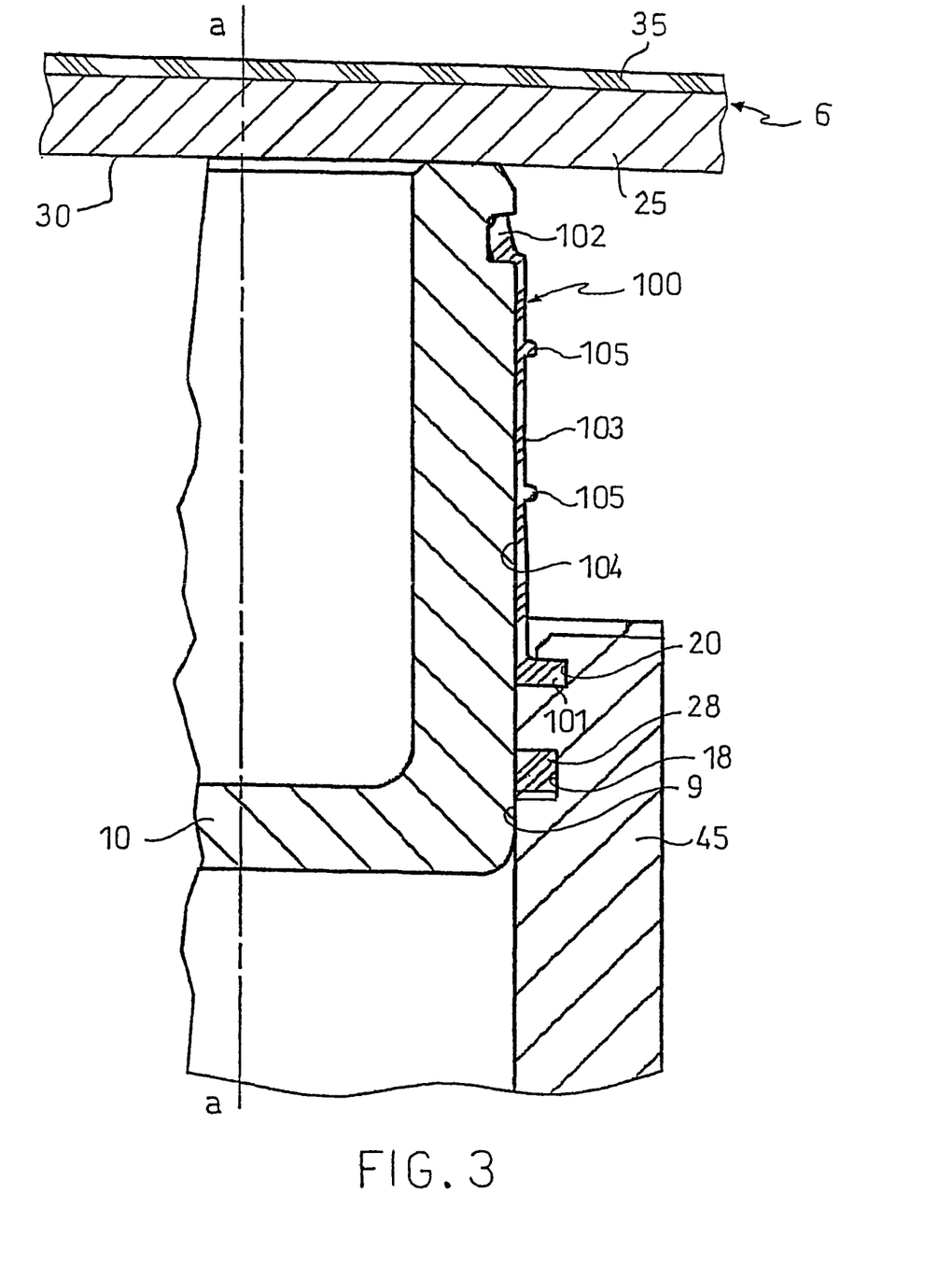
FIG. 3 shows a portion of the disk brake of FIG. 1 with fully worn pads, on an enlarged scale.

In particular, in a condition in which the pads 13 and 14 are new, that is, when the friction linings 35, 36 are not worn (as shown by way of example in FIG. 2), the flexible boot 100 adopts the rolled-up configuration, whereas it is stretched out when the piston 10 extends as a result of wear of the friction linings 35, 36. FIG. 3 shows a portion of the disk brake of FIG. 1 in a condition in which the piston 9 is extended forwards as a result of the friction linings 35, 36 being almost completely worn out. It is pointed out that, in the view of FIG. 3, the flexible boot 100 is adhering to the outer surface of the piston 9 but, in the condition in which the piston 9 is extended forwards, the flexible boot 100 may also adhere to the surface substantially whilst having, for example, a corrugated configuration.

Figure 4:
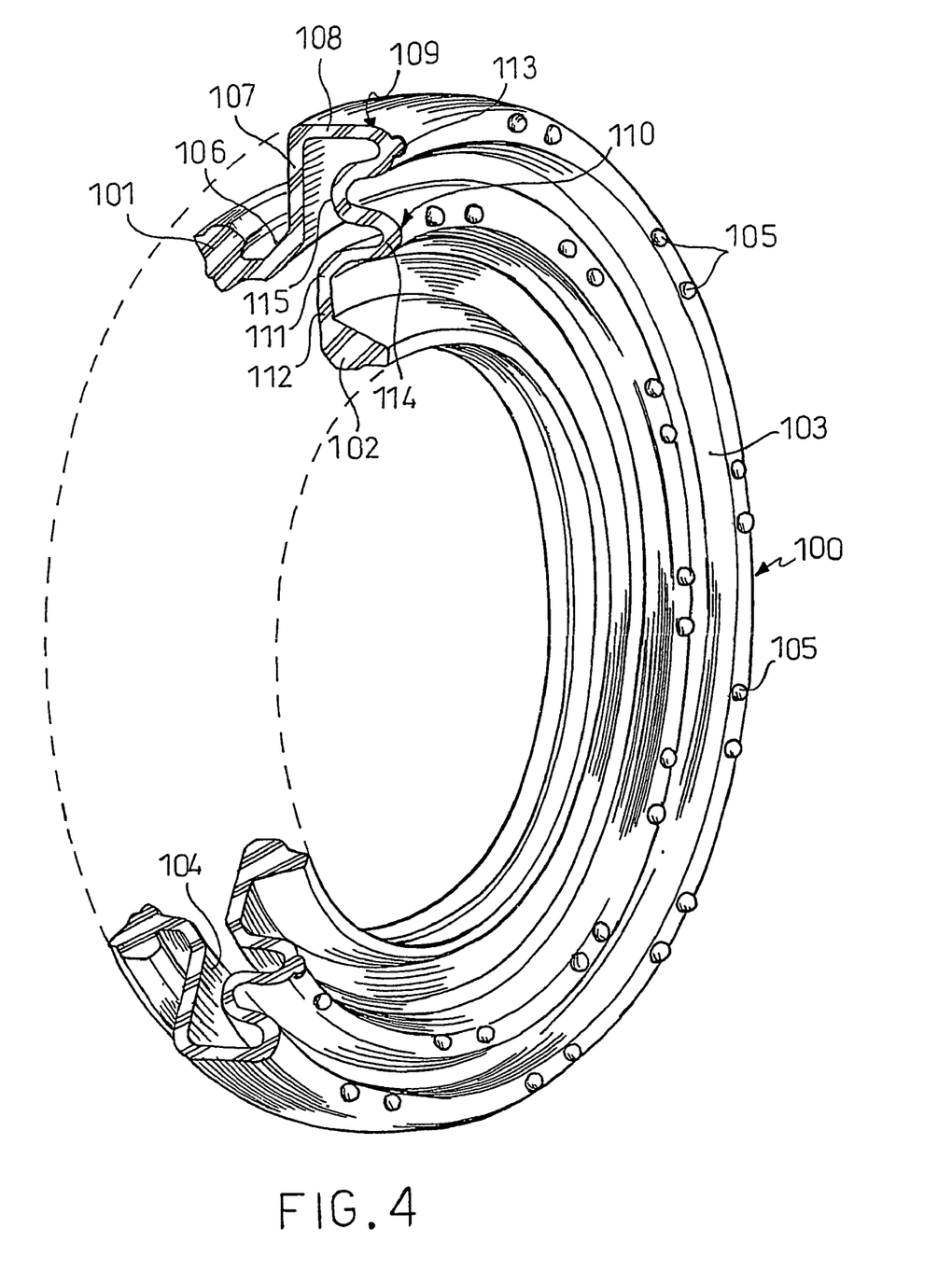
FIG. 4 shows a first embodiment of a flexible boot according to the invention.

FIG. 4 is a partially-sectioned view of the flexible boot 100 when it is in the rolled-up configuration.

At one end, the flexible boot 100 has a first annular region or first engagement ring 101 which is intended to be fixed to the portion 45 defining the cylinder 9 and, at an opposite end, it has a second annular region or second engagement ring 102 to be fixed to the piston 10.

To enable the flexible boot 100 to be fixed, the portion 45 has a groove 20 for housing the first ring 101, in the vicinity of the opening 27, and the piston 10 has a groove 21 for housing the second ring 102, in the vicinity of the head 29. For example, the thickness and shape of the engagement rings 101 and 102 are a such that they can engage in the grooves 20 and 21 which are shaped so as to ensure the fixing of the flexible boot 100. In any case, any other suitable means may be used for fixing the flexible boot 100 to the piston-cylinder unit 19.

Moreover, an optional annular housing 22 is formed in the portion 45, in the region of the opening 27, for at least partially housing the flexible boot 100 when it is in the rolled-up configuration.

The flexible boot 100 has an outer surface 103 and an inner surface 104 and comprises a plurality of concentric annular band-like portions connected to one another and having different diameters.

In greater detail, in the rolled-up condition, the flexible boot 100 comprises a first connecting band 106 between the first engagement ring 101 and a second band 107 which is intended to be housed inside the seat 22 and arranged radially, that is, so as to lie in a plane substantially perpendicular to the axis a-a of the cylinder 9 when the flexible boot 100 is fitted on the piston-cylinder unit 19.

The second band 107 is connected to a third band 108 such as to define a cylinder of axis a-a when the flexible boot 100 is fitted on the piston-cylinder unit 19. The third band 108 is connected to a first pleat 109.

This first pleat 109 is connected to a second pleat 110 which is connected, by means of a fourth band 111, to a fifth band 112 connected to the second engagement ring 102 and arranged radially, that is, so as to lie in a plane substantially perpendicular to the axis a-a of the cylinder 9 when the flexible boot 100 is fitted on the piston-cylinder unit 19.

The first and second pleats 109 and 110 have respective annular convex portions 113 and 114 connected to one another by an annular concave portion 115.

It is pointed out that one or more portions of the outer surface 103 can face the pad 14, that is, these portions face towards the pad and, in particular, towards a wall 30 of the plate 25, when the flexible boot 100 is fitted on the piston-cylinder unit 19. In particular, as shown in FIG. 2, the annular convex portions 113 and 114 can face the pad 14.

The flexible boot 100 advantageously has at least one spacer element 105 which enables at least a portion of the surface 103 to be kept suitably spaced from the pad 14 and, in particular, from the wall 30 of the plate 25.

In the embodiment shown in the drawings, the spacer elements 105 are disposed on the annular convex portions 113 and 114.

The spacer elements 105 are advantageously intended to come into contact with the wall 30, so as to be interposed between the outer surface 103 and the plate 25, preventing direct contact between the plate and portions of the flexible boot 100 such as, for example, the annular convex portions 113 and 114, and thus reducing the exchange of heat between the pad 14 and the flexible boot 100 resulting from a braking operation.

According to one embodiment, the spacer elements 105 are protuberances formed in the boot 100 and may have various shapes. In this connection, it should be noted that, according to one embodiment, shapes which reduce the contact area between the protuberances and the wall 30 of the plate 25 to the minimum, ideally to a point, are particularly suitable for the purpose. In FIG. 4, the spacer elements 105 are substantially spherical cap-shaped protuberances.

Figure 5:
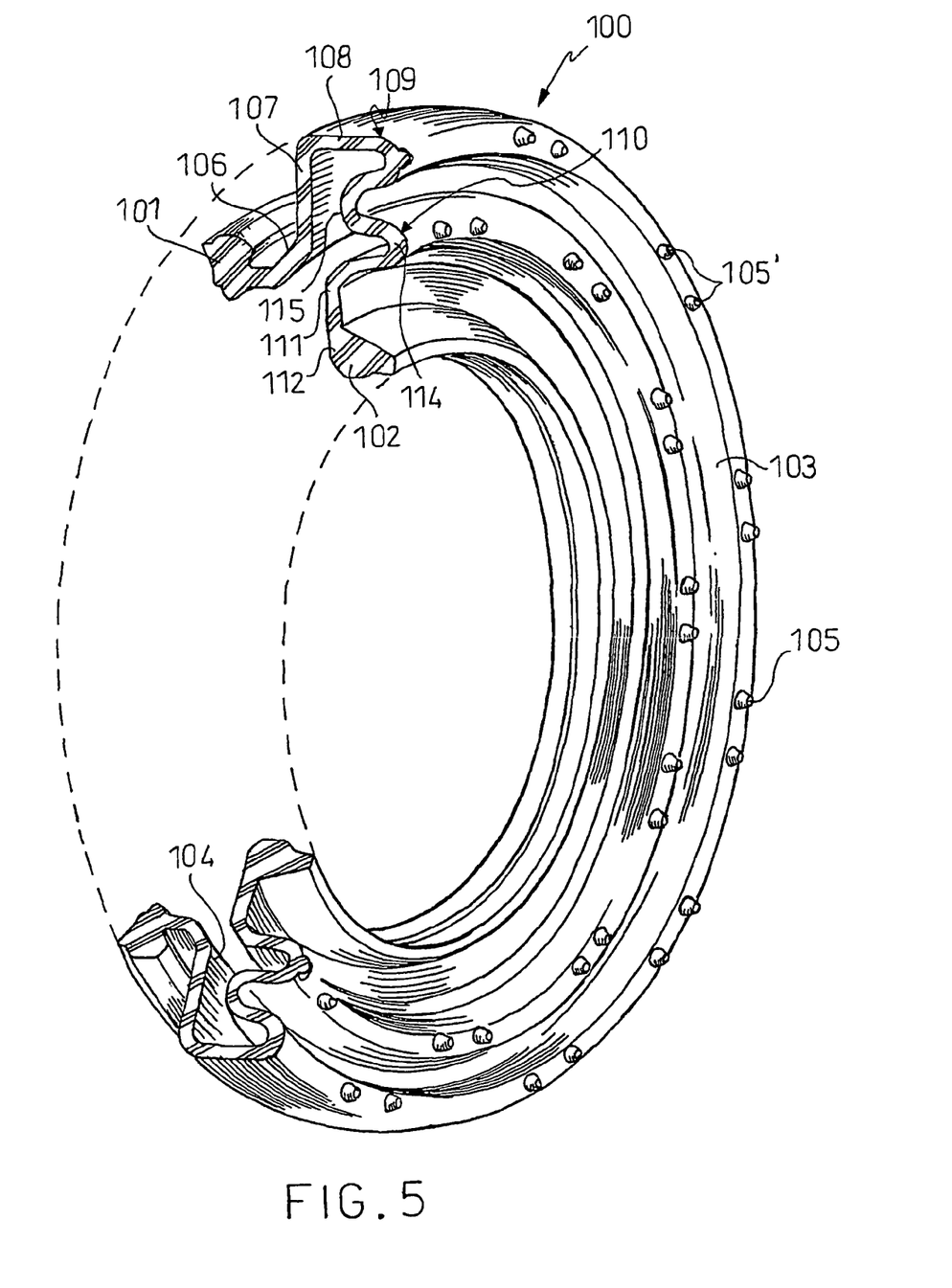
FIG. 5 shows a second embodiment of a flexible boot according to the invention.
Figure 6:
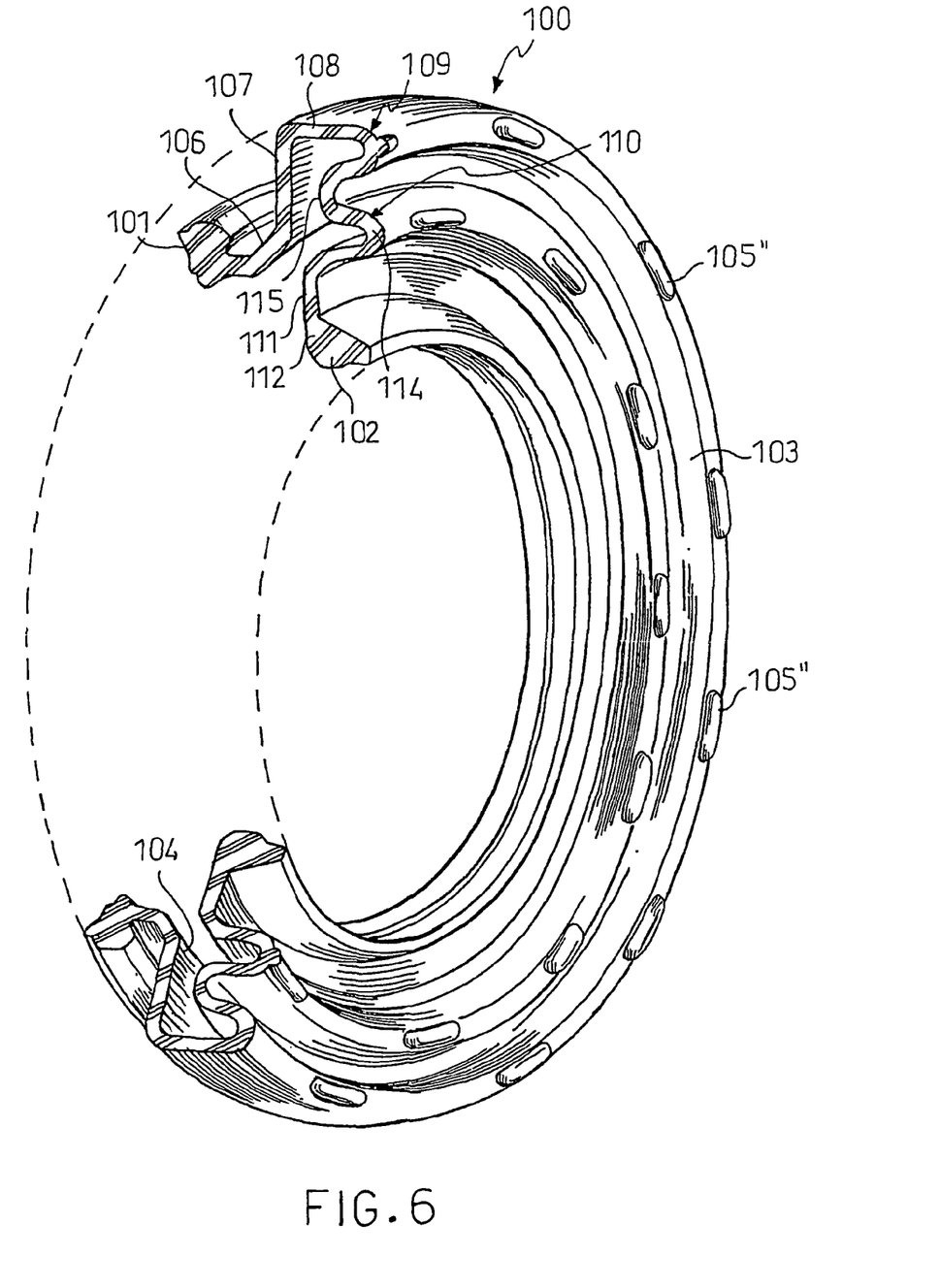
FIG. 6 shows a third embodiment of a flexible boot according to the invention.

As further examples, FIG. 5 shows a flexible boot 100 comprising spacer elements formed with protuberances 105' having a substantially frusto-conical shape and FIG. 6 shows a flexible boot 100 comprising spacer elements formed with frusto-ellipsoidal protuberances 105".

Shapes other than those shown such as, for example, frusto-pyramidal shapes or shapes of irregular cross-section (extending further in one or more directions) may, however be used.

Moreover, the spacer elements 105 may be arranged on the surface 103 of the flexible boot 100 with various possible surface densities. For example, the spacer elements 105 may be distributed substantially uniformly over at least a portion of the surface of the flexible boot (for example, the surfaces of the convex portions 113 and 114) or may be arranged so as to form groups of two or more of these elements which in turn are distributed suitably on the flexible boot 100. In this connection, it will be noted that, in FIGS. 4 and 5, the protuberances 105 and 105' are arranged in groups of two, whereas the protuberances 105" shown in FIG. 6 are distributed substantially uniformly.

The flexible boot 100, provided with the spacer elements 105, can be produced in conventional manner, for example, by the injection of fluidized material into a mould having cavities reproducing the boot in the rolled-up configuration, in negative form. Typically, the materials usable to produce the flexible boot 100 are resistant to brake fluid and can withstand the temperatures to which the boot may be subjected. Preferably, as the temperatures which can be reached during braking increase, the following materials may be used, in order, for the production of the flexible boot 100: SBR (styrene butadiene rubber), EPDM (ethylene-propylene-diene terpolymer) or silicone rubbers, as well as NBR (acrylonitrile butadiene rubbers) for uses in environments in which mineral oil is present.

As already mentioned, the flexible boot 100 is shaped in a manner such that, at rest, it naturally adopts the same rolled-up configuration which it has when it is fitted on the piston-cylinder unit 19 with new pads 13 and 14.

Moreover, in order not appreciably to change this configuration which is adopted naturally by the flexible boot 100, the spacer elements 105 advantageously have suitably small dimensions.

For example, a spacer element 105 of the spherical-cap type may have a radius of between 0.3 mm and 0.9 mm or, preferably between 0.5 mm and 0.7 mm and, in particular, of about 0.6 mm.

It is pointed out that, in the stretched-out configuration, the flexible boot 100 may adopt a considerable length (dependent on the thickness of the pads used). For example, with the use of fixed calipers, this length of the flexible boot 100 may be between 8 mm and 20 mm, and with the use of floating calipers, it may be between 25 mm and 40 mm, but may even reach 50 mm.

Moreover, the flexible boot 100 typically has two or three pleats.

The flexible boot 100 preferably has openings or valves (not shown) of known type which favour the outlet of any air present between the boot and the piston-cylinder unit 19.

During the mounting of the flexible boot 100 on the piston-cylinder unit 19, which can take place in conventional manner, it is possible to arrange for the flexible boot 100 and the spacer elements 105 not to be in contact with the wall 30 of the plate 25 when they are in the rolled-up configuration.

When braking takes place, the piston 10, under the pressure of the brake fluid, exerts a pressure on the plate 25 so that the pad 14 acts on the disk 2 by means of the friction lining 35, exerting a force on the braking band. As a result of the pressing of the pad 14 into contact with the disk 2, an opposing force is exerted on the floating body 5 which is guided by the guides 44 and exerts a force in the opposite direction to the force of the piston 10.

This opposing action of the floating body 5 causes the projection 42 to act on the pad 13 and hence on the disk 2, so that the braking band of the disk is acted on by a force equal and opposite to that exerted by the pad 14.

As stated above, during braking, the disk 2 is overheated, resulting in emission of heat which is transmitted to the pads 13 and 14 and hence to the piston 10. Moreover, the heat emitted is transmitted by means of the piston 10 to any air trapped in the space between the flexible boot 100 and the piston-cylinder unit 19, increasing the pressure which the air exerts on the boot.

For known flexible boots, this pressure may cause an expansion of the flexible boot such as to bring it into contact with the pad 14 and, in particular, with the plate 25. This contact is particularly likely when the friction linings are new, that is, when they are not worn, so that the flexible boot adopts the rolled-up configuration comprising pleats extending towards the pad 14.

As already stated, the pad 14 is at a high temperature and, if it were to come into direct contact with the flexible boot, it could therefore burn it or damage it.

In contrast with what may occur in conventional disk brakes, in the disk brake of FIG. 1, the flexible boot 100 does not come into direct contact with the pad 14, except by means of the spacer elements 105. In particular, the spacer elements 105 keep the flexible boot 100 spaced from the pad 14, even when the boot is expanded by the air trapped in it.

The presence of the spacer elements 105 drastically reduces the area of contact between the flexible boot 100 and the pad 14 and creates a space between them, preventing an exchange of heat such as to cause burning or damage to the flexible boot 100.

The presence of the spacer elements 105 advantageously prevents direct contact of the flexible boot 100 with the pad 14, even when the boot is not arranged in the correct rolled-up configuration, as may occur during its mounting on the piston-cylinder unit 19 or as a result of an operation to replace the pads 13, 14.

Moreover, it is pointed out that, by virtue of the teachings of the present invention, the integrity of the flexible boot can be maintained without necessarily modifying, complicating and/or weakening the structure of the body which defines the cylinder in order to form suitable channels for housing the boot.

Naturally, in order to satisfy contingent and specific requirements, an expert in the art may apply to the above-described flexible boot and disk brake many modifications and variations all of which, however, are included within the scope of protection of the invention as defined by the appended claims.

What is claimed is:

1. A flexible boot for protecting a piston-cylinder unit of a disk brake including a piston, having a predefined axis, slidable in a cylinder in order to act on a brake pad, the flexible boot comprising at one end a first engagement ring which is adapted to be housed in a first groove of said cylinder, said groove being provided in the vicinity of an opening of said cylinder, and said flexible boot comprising, at an opposite end, a second engagement ring to be housed in a second groove provided in the vicinity of a head of said piston; said second ring having a first end suitable to be disposed closed to the pad and an opposite end disposed far from said pad in the rolled-up condition, the flexible boot also comprising a first connecting band between the first engagement ring and a second band suitable to be housed inside a seat formed in a portion of the cylinder disposed in the region of the opening and arranged radially, in a plane substantially perpendicular to the axis of the cylinder when the flexible boot is fitted on the piston-cylinder unit, in the rolled-up condition, the flexible boot also comprising a fifth band connected to the opposite end of said second engagement ring; said fifth band being arranged radially, in a plane substantially perpendicular to the axis of the cylinder when the flexible boot is fitted on the piston-cylinder unit; the flexible boot further comprising a surface, an annular portion of said surface adapted to face a wall of the pad when said boot is in a rolled-up configuration, said annular portion having at least one spacer element extending laterally from said surface and along less than the entirety of said annular portion, said spacer element being configured to have a circular cross section shape and to taper such that said spacer element reduces in cross sectional area as the spacer element extends laterally away from said surface, said spacer element thereby coming into contact with the wall of the pad at a minimized surface area of said spacer element and keeping the annular portion of the surface spaced from the wall of the pad;

wherein the spacer elements are formed in pairs distributed across the annular portion with a distance between each adjacent pair, each pair formed of two adjacent spacer elements arranged at a distance closer to each other than the distance between each adjacent pair.

2. The flexible boot according to claim 1 in which the at least one spacer element is a protuberance of the flexible boot which is adapted to extend towards the wall of the pad.

3. The flexible boot according to claim 2 in which the protuberance has the shape of a spherical cap.

4. The flexible boot according to claim 3 in which the spherical cap has a radius of between about 0.3 mm and 0.9 mm.

5. The flexible boot according to claim 2 in which the protuberance is frusto-conical.

6. The flexible boot according to claim 1, comprising a plurality of connected annular bands and at least one pleat, said boot adapting said rolled-up configuration when the piston is-substantially inside the cylinder and a stretched-out configuration when the piston extends out of the cylinder.

7. The flexible boot according to claim 6 in which the at least one pleat has a convex portion which can face the wall, the at least one spacer element being disposed on the convex portion.

8. The flexible boot according to claim 1 made of one of the materials belonging to the group consisting of: styrene butadiene rubber, ethylene-propylene-diene terpolymer, silicone rubber, and acrylonitrile butadiene rubber.

9. The piston-cylinder unit according to claim 1 in which the boot comprises at least thirty spacer elements distributed across at least two connecting bands.

10. A piston-cylinder unit for a disk brake, comprising:
a cylinder;
a piston slidably engaged within said cylinder;
a brake pad having a wall, said piston being connected to said pad by said wall such that said piston applies a force on said pad when said piston slides in said cylinder; and
a flexible boot adapted to fit between said piston and said cylinder to protect said piston and said cylinder, said flexible boot comprising a first connecting band between a first engagement ring and a second band suitable to be housed inside a seat formed in a portion of the cylinder and arranged radially, in a plane substantially perpendicular to the axis of the cylinder when the flexible boot is fitted on the piston-cylinder unit, in the rolled-up condition, the flexible boot also comprising a fifth band connected to the opposite end of a second engagement ring; said fifth band being arranged radially, in a plane substantially perpendicular to the axis of the cylinder when the flexible boot is fitted on the piston-cylinder unit; the flexible boot further comprising a surface, an annular portion of said surface adapted to face the wall of the pad when said boot is in a rolled-up configuration, said annular portion having at least one spacer element extending laterally from said surface and along less than the entirety of said annular portion, said spacer element being configured to have a circular cross section shape and to taper such that said spacer element reduces in cross sectional area as the spacer element extends laterally away from said surface, said spacer element thereby coming into contact with the wall of the pad at a minimized surface area of said spacer element and keeping the annular portion of the surface spaced from the wall of the pad;
wherein the spacer elements are formed in pairs distributed across the annular portion with a distance between each adjacent pair, each pair formed of two adjacent spacer elements arranged at a distance closer to each other than the distance between each adjacent pair.

11. The piston-cylinder unit according to claim 10 in which an end of said cylinder defines an opening of said cylinder, said cylinder having a first seat for housing a first annular end of the boot, and the piston having a second seat for housing a second annular end of the boot.

12. The piston-cylinder unit according to claim 11 in which the first and second seats comprise a first annular groove and a second annular groove, respectively, and wherein said first annular groove engages said first annular end and said second annular groove engages said second annular end.

13. The piston-cylinder unit according to claim 10 in which said end of said cylinder has an annular housing depression for at least partially housing the flexible boot when in said rolled-up configuration.

14. The disk brake according to claim 10, wherein said boot is made of one of the materials belonging to the group consisting of: styrene butadiene rubber, ethylene-propylene-diene terpolymer, silicone rubber, and acrylonitrile butadiene rubber.

15. The piston-cylinder unit according to claim 10 in which the at least one spacer element is a protuberance of the flexible boot which is adapted to extend towards the wall of the pad.

16. The piston-cylinder unit according to claim 15 in which the protuberance has the shape of a spherical cap.

17. The piston-cylinder unit according to claim 16 in which the spherical cap has a radius of between about 0.3 mm and 0.9 mm.

18. The piston-cylinder unit according to claim 15 in which the protuberance is frusto-conical.

19. The piston-cylinder unit according to claim 10 in which the boot comprises at least thirty spacer elements distributed across at least two connecting bands.

20. A disk brake comprising: a brake pad for exerting a braking force on a disk associated with the disk brake, and at least one piston-cylinder unit, said unit including a cylinder and a piston slidable in the cylinder in order to act on the braking pad, said unit also including a flexible boot adapted to fit between said piston and said cylinder to protect said piston and said cylinder, said flexible boot comprising a first connecting band between a first engagement ring and a second band suitable to be housed inside a seat formed in a portion of the cylinder and arranged radially, in a plane substantially perpendicular to the axis of the cylinder when the flexible boot is fitted on the piston-cylinder unit, in the rolled-up condition, the flexible boot also comprising a fifth band connected to the opposite end of a second engagement ring; said fifth band being arranged radially, in a plane substantially perpendicular to the axis of the cylinder when the flexible boot is fitted on the piston-cylinder unit; the flexible boot further comprising a surface, an annular portion of said surface adapted to face a wall of the pad when said boot is in a rolled-up configuration, said annular portion having at least one spacer element extending laterally from said surface and along less than the entirety of said annular portion, said spacer element being configured to have a circular cross section shape and to taper such that said spacer element reduces in cross sectional area as the spacer element extends laterally away from said surface, said spacer element thereby coming into contact with the wall of the pad at a minimized surface area of said spacer element and keeping the annular portion of the surface spaced from the wall of the pad;

wherein the spacer elements are formed in pairs distributed across the annular portion with a distance between each adjacent pair, each pair formed of two adjacent spacer elements arranged at a distance closer to each other than the distance between each adjacent pair.

21. The disk brake according to claim 20 in which the at least one spacer element is a protuberance of the flexible boot which is adapted to extend towards the wall of the pad.

22. The disk brake according to claim 21 in which the protuberance has the shape of a spherical cap.

23. The disk brake according to claim 22 in which the spherical cap has a radius of between about 0.3 mm and 0.9 mm.

24. The disk brake according to claim 21 in which the protuberance is frusto-conical.

25. The disk brake according to claim 20, comprising a plurality of connected annular bands and at least one pleat, said boot adopting said rolled-up configuration when the piston is substantially inside the cylinder and adopting a stretched-out configuration when the piston extends out of the cylinder.

26. The disk brake according to claim 25 in which the at least one pleat has a convex portion which can face the wall, the at least one spacer element being disposed on the convex portion.

27. The disk brake according to claim 20, comprising a first annular end for engagement on the cylinder and a second annular end for engagement on the piston.

28. The piston-cylinder unit according to claim 20 in which the boot comprises at least thirty spacer elements distributed across at least two connecting bands.

* * * * *